United States Patent [19]

Soelch

[11] Patent Number: 5,302,691
[45] Date of Patent: Apr. 12, 1994

[54] MANUFACTURE OF TEREPHTHALIC ACID/2-METHYLPENTAMETHYLENE DIAMINE/HEXAMETHYLENE DIAMINE COPOLYAMIDES

[75] Inventor: Richard R. Soelch, Wilmington, Del.

[73] Assignee: Du Pont Canada Inc., Mississauga, Canada

[21] Appl. No.: 885,330

[22] Filed: May 19, 1992

[51] Int. Cl.$^5$ .............................................. C08G 69/28
[52] U.S. Cl. ................... 528/349; 528/335; 528/338; 528/339; 528/340; 528/347
[58] Field of Search ............... 528/349, 347, 338, 339, 528/340, 335

[56] References Cited

U.S. PATENT DOCUMENTS 5,109,106 4/1992 Lahary et al. ..................... 528/349

FOREIGN PATENT DOCUMENTS 9100442 11/1991 PCT Int'l Appl. .
9115537 10/1991 World Int. Prop. O. .

*Primary Examiner*—Harold D. Anderson

[57] ABSTRACT

A process for the copolymerization of (1) a carboxylic acid consisting of terephthalic acid and mixtures thereof with isophthalic acid with (2) a mixture of hexamethylene diamine and 2-methyl pentamethylene diamine. The combined amount of isophthalic acid and 2-methyl pentamethylene diamine is controlled so that the resultant copolyamide, when annealed, has less than 1% by weight based on the total weight of the copolyamide of fractions having melting points greater than 320° C. Preferably, the combined amount of isophthalic acid and 2-methyl pentamethylene diamine is greater than 27.5%, molar basis, of the total amount of acid and diamine.

4 Claims, No Drawings

MANUFACTURE OF TEREPHTHALIC ACID/2-METHYLPENTAMETHYLENE DIAMINE/HEXAMETHYLENE DIAMINE COPOLYAMIDES

The present invention relates to a process for the manufacture of copolyamides of terephthalic acid, and especially to the manufacture of such copolyamides without formation of a high melting fraction.

As used herein, a "single step" polymerization process is a polymerization process in which monomers are subjected to a polymerization cycle in a reactor that concludes with the pressure being returned to substantially atmospheric pressure. It is understood that the copolyamide obtained from such a process may be subjected to further processing, including finishing and extrusion, before or after pelletization.

Polymers formed from terephthalic acid and diamines are known in the art. For instance, PCT patent application CA91/00442 of S. L. Mok and R. U. Pagilagan, filed 1991 Dec. 11, discloses copolyamides of terephthalic acid with hexamethylene diamine and 2-methyl pentamethylene diamine, optionally containing isophthalic acid, having melting points of at least 280° C. Other polyamides of terephthalic acid are referred to therein.

Single-step polymerization processes have the advantage that polymer is manufactured in a single step, as opposed to two step or multi-step processes, thereby reducing handling of the partially formed polymer during the intermediate stages of the process. However, in the manufacture of copolyamides of terephthalic acid, especially copolyamides of terephthalic acid, hexamethylene diamine and 2-methyl pentamethylene diamine, using a single step polymerization process, it has been found that a high melting fraction is formed.

The high melting fraction, with a melting point in excess of 320° C. and especially approximately 334° C., is usually not noticed in the first batch of polymer produced in an autoclave, but becomes apparent in subsequent batches made in the same autoclave without steps being taken to clean-out the autoclave between consecutive batches. As the polymer would normally be subsequently processed at melt temperatures of less than 320° C., the high melting fraction manifests itself as unmelted or gel-like portions of polymer, which are commercially unacceptable; the gel-like portions are believed to be essentially comprised of a high melting crystalline phase, which is soluble in sulphuric acid, and not gel per se which would not be soluble in sulphuric acid.

It has now been found that copolymers of terephthalic acid, optionally including isophthalic acid, and mixtures of hexamethylene diamine and 2-methyl pentamethylene diamine, may be manufactured without the formation of a high melting fraction in significant amounts.

Accordingly, the present invention provides a process for the preparation of a partially crystalline copolyamide comprising the polymerization stages of:

(a) feeding to a reactor an aqueous salt solution of an admixture of aromatic carboxylic acid and aliphatic diamine, (i) said aromatic carboxylic acid being selected from of terephthalic acid and mixtures of terephthalic acid and isophthalic acid and (ii) said aliphatic diamine being a mixture of hexamethylene diamine and 2-methyl pentamethylene diamine;

(b) heating the aqueous salt solution under pressure and venting water and other volatile matter from the reactor;

(c) reducing the pressure in the reactor to atmospheric pressure;

(d) controlling stages (b) and (c) so as to avoid excessive foaming of the admixture in the reactor; and (e) discharging the copolyamide so obtained from the reactor;

the total amount of isophthalic acid, if any, and 2-methyl pentamethylene diamine fed to reactor in stage (a) being selected so that on being annealed the copolyamide has less than 1% by weight, based on the total amount of copolyamide, of fractions with melting points greater than 320° C.

In preferred embodiments of the process of the invention, the stages of the process are controlled so that the copolyamide produced has an inherent viscosity of at least 0.6 dL/g, especially at least 0.8 dL/g.

In a further embodiment of the process of the invention, stage (c) additionally includes maintaining the admixture in the reactor under a vacuum.

In another embodiment, the acid and diamine are selected such that the combined amount of isophthalic acid and 2-methyl pentamethylene diamine is at least 27.5%, molar basis, especially greater than 30%, of the total amount of acid and diamine.

The present invention further provides in a process for the preparation of multiple consecutive batches of a partially crystalline copolyamide of terephthalic acid and hexamethylene diamine in a reactor without clean-out of the reactor, in which the copolyamide obtained from such process contains more than 1% by weight of a fraction with an annealed melting point of greater than 320° C., said process comprising the stages of:

(a) feeding to a reactor an aqueous salt solution of an admixture of aromatic carboxylic acid and aliphatic diamine, (i) said aromatic carboxylic acid being selected from terephthalic acid and mixtures of terephthalic acid and isophthalic acid and (ii) said aliphatic diamine being a mixture of hexamethylene diamine and 2-methyl pentamethylene diamine;

(b) heating the aqueous salt solution under pressure and venting water and other volatile matter from the reactor;

(c) reducing the pressure in the reactor to atmospheric pressure;

(d) controlling stages (b) and (c) so as to avoid excessive foaming of the admixture in the reactor; and (e) discharging the copolyamide so obtained from the reactor;

the improvement comprising reducing the amount of the fraction with the annealed melting point of greater than 320° C. to less than 1% by feeding to the reactor an aqueous solution containing a combined amount of isophthalic acid and 2-methyl pentamethylene diamine of at least 27.5%, molar basis, of the total amount of acid and diamine.

In preferred embodiments of the process of the invention, the stages of the process are controlled so that the copolyamide produced has an inherent viscosity of at least 0.6 dL/g, especially at least 0.8 dL/g.

In addition, the present invention provides in a process for the copolymerization of (1) a carboxylic acid consisting of terephthalic acid and mixtures thereof with isophthalic acid with (2) a mixture of hexamethylene diamine and 2-methyl pentamethylene diamine, the improvement comprising controlling the combined amount of isophthalic acid and 2-methyl pentamethylene diamine so that the resultant copolyamide, when annealed, has less than 1% by weight based on the total weight of the copolyamide of fractions having melting points greater than 320° C.

As used herein, "clean-out" of a reactor means steps taken to clean or remove high molecular weight polyamide, degradation or gel products and other matter that is not discharged from the reactor under normal processing conditions.

The present invention relates to the manufacture of partially crystalline copolyamides formed from an aromatic carboxylic acid and a mixture of hexamethylene diamine and 2-methyl pentamethylene diamine. The aromatic carboxylic acid is terephthalic acid or a mixture of terephthalic acid and isophthalic acid.

The amounts of acid and diamines should be substantially complementary on a molar basis, as will be appreciated by persons skilled in the art. An excess of acids or diamines, especially the latter, may be used depending on the desired characteristics of the copolyamide and the nature and extent of side reactions that may produce volatile or other matter; as noted below, diamines tend to be more volatile than acids.

The amount of isophthalic acid plus 2-methyl pentamethylene diamine is selected so that the copolyamide obtained has less than 1% by weight, especially less than 0.1% by weight and in particular less than 0.01% by weight, of fractions having a melting point of greater than 320° C. In preferred embodiments, the amount of isophthalic acid plus 2-methyl pentamethylene diamine is selected so as to be at least 27.5%, molar basis, of the total amount of acid and diamine monomers. In more preferred embodiments, the amount of isophthalic acid plus 2-methyl pentamethylene diamine is at least 30%, molar basis, of the total amount of acid and diamine monomers.

The copolyamides produced by the process of the present invention are generally partially crystalline polymers, rather than an amorphous polymer. In embodiments, the polymers have a heat of fusion of greater than 17 J/g. Crystallinity may be determined using a differential scanning calorimeter.

The copolyamide is prepared in a polymerization process in which an aqueous salt solution of the aromatic carboxylic acids, hexamethylene diamine and 2-methyl pentamethylene diamine is fed to a reactor. The presence of 2-methyl pentamethylene diamine appears to moderate branching that is understood to occur in a copolymer of terephthalic acid, isophthalic acid and hexamethylene diamine. The molar amount of aromatic acid is substantially complementary to the total molar amount of the diamines, as discussed above. As is known, diamines tend to be more volatile than carboxylic acids and thus it may be desirable to feed an excess of diamine to the reactor. Catalysts may also be used e.g. phosphinic acid and/or the sodium or potassium salts thereof, phosphorus acid, hypophosphorous acid, sodium hypophosphite, phosphoric acid and the like; typical amounts of catalysts are 0.5–1.00% by weight, especially 0.10–0.20% by weight.

In the process, the aqueous salt solution is heated in a reactor (autoclave) under pressure. The actual pressure used will depend in part on the particular copolyamide that is to be produced in the process. In preferred embodiments, the pressure is at least 1300 kPa, preferably at least 1900 kPa. Water and other volatile matter, which may include diamine, is vented from the reactor.

The temperature of the admixture in the reactor will normally exceed at least 250° C., and especially be in the range of 270°–310° C. The pressure in the reactor is then reduced to atmospheric pressure, especially over a period of at least 15 minutes, particularly over a period of 20 to 90 minutes. The pressure should be reduced in a manner that minimizes or avoids excessive foaming of the reaction mixture in the reactor. Anti-foam agents may be added to reduce the amount of foaming. The reaction mixture is then maintained at about atmospheric pressure or under a vacuum until the copolyamide has reached a predetermined molecular weight. The copolyamide thus obtained is discharged from the reactor. It should be understood, however, that the copolyamides may be manufactured using continuous polymerization techniques and/or subjected to solid phase polymerization or other further processing steps.

As is illustrated herein, the use of a polymerization process such as that described above will often result in the formation of a high melting fraction of copolyamide, with a melting point after annealing of greater than about 320° C., and especially in the range of about 330°–335° C. The high melting fraction will normally not be apparent in the first batch of copolyamide formed in an autoclave i.e. the first batch formed after the autoclave has been thoroughly cleaned. The high melting fraction will normally appear, if it is going to appear, in the second or third batches of copolyamide formed in the autoclave. It is not practical or economic to clean out an autoclave after each and every batch of copolyamide has been produced.

In order to prevent formation of the high melting fraction, or to at least reduce the amount of high melting fraction to less than 1% by weight, and especially less than 0.01% by weight, the amount of isophthalic acid plus 2-methyl pentamethylene diamine in the aqueous solution fed to the reactor is maintained at at least 27.5% by weight, especially at least 30% by weight.

The copolyamides of the invention may be blended with stabilizers, flame retardants, smoke depressants, plasticizers, conductive and/or anti-static agents, lubricants and mould release agents, nucleating agents, dyes and pigments, fillers including glass fibres, minerals, toughening and other modifying agents, and other additives that may be used in polyamide compositions. Examples of heat stabilizers include copper(I) halides e.g. bromide and iodide, and alkali halides e.g. lithium, sodium and potassium bromides and iodides, which may be used with or without phosphorus compounds. Examples of the latter are phosphites, phosphines, phosphates and alkali metal salts of phosphorus acids e.g. sodium phenyl phosphinate, sodium hypophosphite, triaryl- and tris(alkylaryl) phosphines e.g. tri-n-butyl phosphine, phenyl dimethyl phosphine and triphenyl phosphine. The organic heat stabilizers include hindered phenols and hindered amines, as well as UV stabilizers and phenolic metal deactivators. Nucleating agents include talc, calcium fluoride and salts of phosphorus acids, for example sodium phenyl phosphinate.

A wide range of fillers may be used e.g. in amounts of 0.5–200 parts of filler per 100 parts of copolyamide. Examples of such fillers include, but are not limited to, silica, metasilicates, alumina, talc, diatomaceous earth, clay, kaolin, quartz, glass, mica, titanium dioxide, molybdenum disulphide, gypsum, iron oxide, zinc oxide, fibres e.g. glass, carbon, boron, aromatic and ceramic fibres, powdered polytetrafluoroethylene and the like.

The copolyamides may be used in the manufacture of products using melt processing techniques, especially products intended for use at temperatures that are higher than those typically used with other polyamides. For example, the copolyamides may be formed into articles using injection moulding technology e.g. into valves, tanks, containers, washers and the like for automotive end-uses, into articles for electrical end-uses e.g. parts requiring resistance to temperatures of 260° C. or above, and articles where retention of mechanical properties under the influence of heat, moisture, hydrocarbons, alcohols including so-called gasohol, and the like are important. Alternatively, the polymers may be spun into fibres e.g. for sewing or industrial threads for end-uses where low shrinkage and elongation are important and/or retention of properties under the influence of moisture, hydrocarbons, alcohols and the like is important. The copolyamides may also be formed into film and sheet. Barrier properties of the copolyamides to water and oxygen may also find uses. The copolyamides may be particularly useful for end-uses where retention of properties at elevated temperatures is required, including as retortable containers.

In embodiments of the invention, the copolyamide is in the form of a fibre, or filament. The fibre preferably has a tenacity of at least 1.5 g/denier and a modulus of at least 30 g/denier.

The present invention is illustrated by the following examples.

EXAMPLE I

A 12 L reaction vessel equipped with a helical ribbon agitator was charged with 2393.1 g (14.42 moles) of terephthalic acid, 265.9 g (1.60 moles) of isophthalic acid, 976 g (8.41 moles) of 2-methyl pentamethylene diamine, 1454.1 g of 67.12% (weight basis) of aqueous hexamethylene diamine solution (8.41 moles), 12 g of 47% (weight basis) of aqueous sodium phenylphosphinate solution, 6 ml of 10% (weight basis) Carbowax ® 3350 polyethylene glycol in water and 1100 g of demineralized water. Thus, isophthalic acid and 2-methyl pentamethylene diamine constituted 30.5% of the monomers fed to the reactor.

With the agitator rotating at 50 rpm, the mixture was heated to 130° C., vented to remove entrained oxygen and then heated to 224° C. With the reaction pressure maintained at 1.90 MPa, volatile matter was released over a period of 64 minutes, during which period of time the temperature of the reaction mixture rose to 275° C. The pressure in the reaction mixture was then reduced to atmospheric pressure over a period of 60 minutes, the temperature in the reaction mixture rising to 314° C. The rate of agitation was reduced to 5 rpm. The reaction mixture was maintained under a vacuum of 40 kPa for 15 minutes and then the polymer obtained was discharged from the reactor and quenched in a water bath.

The polymer obtained had an inherent viscosity (IV) of 0.96 dL/g; inherent viscosity was measured on a 5.0 g/L solution in m-cresol. The polymer had a single melting point of 289° C., as measured by differential scanning calorimetry (DSC), a $T_g$ of 126° C. (DAM, dry as moulded), a heat deflection temperature (HDT) of 142° C. (1.8 MPa, DAM) and a notched Izod impact strength of "1.54 ft lb/in in SI". The polymer did not exhibit the presence of a higher melting fraction.

EXAMPLE II

The vessel of Example I was charged with 2659 g (16.01 moles) of terephthalic acid, 1093 g (9.42 moles) of 2-methyl pentamethylene diamine, 1182.4 g of 58.53% (weight basis) of aqueous hexamethylene diamine solution (7.72 moles), 12 g of 47% (weight basis) of aqueous sodium phenylphosphinate solution, 6 ml of 10% (weight basis) Carbowax ® 3350 polyethylene glycol in water and 1100 g of demineralized water. Copolyamide was produced using the procedure of Example I. 2-Methyl pentamethylene diamine constituted 28.4% of the total monomers fed to the reactor; the reaction mixture did not contain isophthalic acid.

The copolyamide obtained had an IV of 0.68 dL/g and a melting point of 296° C. The polymer did not exhibit a high melt fraction.

EXAMPLE III

Using the procedure of Example I, a series of polymers were prepared using different ratios of monomers. The polymers were checked using DSC for the presence or absence of the high melting fraction.

Tests were performed on unfilled polymer and on polymer filled with glass fibre.

The copolyamide compositions were moulded into test specimens using an Engel ® or a Boy injection moulding machine. The test samples were Type I tensile bars as specified in ASTM procedure D638, and ⅛" and ¼" flexural bars as specified in ASTM procedure D790. The specimens were moulded using a mould temperature of 80° C. and an extruder barrel temperature of 320° C. Measurements were made using the following ASTM procedures: Flexural Modulus—D790; Tensile Strength—D638; Notched Izod Impact Strength—D256. Melting point and heat of fusion were determined under a nitrogen atmosphere using a differential scanning calorimeter (Du Pont 912 DCDSC), at a rate of temperature rise of 10° C. per minute, the temperature at the top of the endothermic curve being deemed to be the melting point. Glass transition temperature was determined by differential mechanical analysis at a rate of increase in temperature of 5° C./minute, operated under a nitrogen atmosphere.

Storage Modulus is measured using the procedure of ASTM D 4065-82, Measurements are made of viscoelastic behaviour using dynamic mechanical analysis, which provides information on an elastic component, known as storage modulus, and on a viscous component, known as loss modulus. Measurements made while the temperature is being changed lead to information on the $T_g$ of the polymer, a heating rate of 5° C. being used; data on $T_g$ reported herein was obtained from a plot of storage modulus against temperature, being the temperature of significant decrease in storage modulus with increasing temperature.

Further details and the results obtained are given in Table I.

TABLE I

| Run No. | 1 | 2 | 3 | 4 |
|---|---|---|---|---|
| Polymer Composition* | | | | |
| T | 50 | 50 | 47.5 | 45 |
| I | — | — | 2.5 | 5 |
| HMD | 25 | 22.5 | 25 | 25 |
| MPMD | 25 | 27.5 | 25 | 25 |
| High Melting Phase | yes (severe) | no | yes (some) | no |

TABLE I-continued

| Properties - Unfilled Polymer | | | | |
|---|---|---|---|---|
| IV (dL/g) | 0.90 | 0.80 | 0.92 | 0.96 |
| $T_m$ (°C.) | 303 | 293 | 297 | 289 |
| Tensile Strength (MPa) | 88.9 | — | 89.0 | 90.0 |
| Elongation (%) | — | — | 9 | 47 |
| Flexural Modulus (MPa) | 3020 | — | 3025 | 2725 |
| Notched Izod (J/m) | 43 | — | 46 | 82 |
| $T_g$ (°C.) | 125 | — | 123 | 126 |
| HDT (1.8 MPa, °C., DAM) | 147 | — | 146 | 142 |
| Properties - Filled Polymer | | | | |
| Glass fibre (wt %) | 35 | 33 | 35 | 34 |
| Tensile Strength (MPa) | 196 | 167 | 192 | 207 |
| Flexural Modulus (MPa) | 9760 | 9200 | 9140 | 9550 |
| Notched Izod (J/m) | 80 | 101 | 91 | 91 |
| HDT (1.8 MPa, °C., DAM) | 264 | 261 | 253 | 236 |

| Run No. | 5 | 6 | 7 | 8 | 9 | 10 |
|---|---|---|---|---|---|---|
| Polymer Composition* | | | | | | |
| T | 30 | 35 | 35 | 47.5 | 45 | 35 |
| I | 20 | 15 | 15 | 2.5 | 5 | 15 |
| HMD | 45 | 40 | 45 | 27.5 | 27.5 | 35 |
| MPMD | 5 | 10 | 5 | 22.5 | 22.5 | 15 |
| High Melting Phase | yes | yes | no | yes | yes | no |
| $T_m$ (°C.) | 285 | 293 | 300 | 303 | 296 | 298 |
| IV (dL/g) | 0.74 | 0.83 | 0.63 | 0.84 | 0.84 | 0.94 |

*T = terephthalic acid
I = isophthalic acid
HMD = hexamethylene diamine
MPMD = 2-methyl pentamethylene diamine This example shows that copolyamides having a combined amount of isophthalic acid and 2-methyl pentamethylene diamine in excess of 27.5% do not exhibit the presence of high melting fraction in consecutive runs in the autoclave. In some instances, copolyamides having a combined amount of isophthalic acid and 2-methyl pentamethylene diamine of 27.5% does show the presence of the high melting fraction.

I claim:

1. A process for the preparation of a partially crystalline copolyamide comprising the polymerization stages of:
   (a) feeding to a reactor an aqueous salt solution of an admixture of aromatic carboxylic acid and aliphatic diamine, (i) said aromatic carboxylic acid being selected from terephthalic acid or a mixture of terephthalic acid and isophthalic acid and (ii) said aliphatic diamine being a mixture of hexamethylene diamine and 2-methyl pentamethylene diamine;
   (b) heating aqueous salt solution under pressure and venting water and other volatile matter from the reactor;
   (c) reducing the pressure in the reactor to atmospheric pressure;
   (d) controlling stages (b) and (c) so as to avoid excessive foaming of the admixture in the reactor; and
   (e) discharging the copolyamides obtained from the reactor;

wherein the total amount of 2-methyl pentamethylene diamine and, when present, isophthalic acid fed to reactor in stage (a) is selected so that the copolyamide has less than 1% by weight, based on the total amount of copolyamide, of fractions with melting points greater than 320° C.

2. The process of claim 1 in which stage (c) additionally includes maintaining the admixture in the reactor under a vacuum.

3. The process of claim 1 in which the acid and diamine are selected such that the amount of isophthalic acid and 2-methyl pentamethylene diamine is at least 27.5%, molar basis, of the total amount of acid and diamine.

4. The process of claim 3 in which the acid and diamine are selected such that the amount of isophthalic acid and 2-methyl pentamethylene diamine is at least 30%, molar basis, of the total amount of acid and diamine.

* * * * *